(12) United States Patent
Senriuchi et al.

(10) Patent No.: US 12,235,102 B2
(45) Date of Patent: Feb. 25, 2025

(54) MEASURING DEVICE AND MEASURING SYSTEM

(71) Applicant: TDK Corporation, Tokyo (JP)

(72) Inventors: Tadao Senriuchi, Tokyo (JP); Sadaharu Yoneda, Tokyo (JP)

(73) Assignee: TDK Corporation, Tokyo (JP)

( * ) Notice: Subject to any disclaimer, the term of this patent is extended or adjusted under 35 U.S.C. 154(b) by 311 days.

(21) Appl. No.: 17/768,438

(22) PCT Filed: Sep. 18, 2020

(86) PCT No.: PCT/JP2020/035638
§ 371 (c)(1),
(2) Date: Apr. 12, 2022

(87) PCT Pub. No.: WO2021/075214
PCT Pub. Date: Apr. 22, 2021

(65) Prior Publication Data
US 2023/0251076 A1     Aug. 10, 2023

(30) Foreign Application Priority Data

Oct. 17, 2019   (JP) ................................. 2019-190609
Feb. 27, 2020   (JP) ................................. 2020-031137

(51) Int. Cl.
*B60C 23/06*     (2006.01)
*B60C 19/00*     (2006.01)
(Continued)

(52) U.S. Cl.
CPC .............. *G01B 7/20* (2013.01); *B60C 23/041* (2013.01); *B60C 23/0483* (2013.01);
(Continued)

(58) Field of Classification Search
CPC ..... G01B 7/20; B60C 23/041; B60C 23/0483; B60C 23/064; B60C 23/20;
(Continued)

(56) References Cited

U.S. PATENT DOCUMENTS

2004/0012062 A1    1/2004  Miyajima et al.
2004/0118196 A1    6/2004  Landes et al.
(Continued)

FOREIGN PATENT DOCUMENTS

CN            1469100 A       1/2004
CN          110304604 A   *  10/2019   ........... B81B 7/0058
(Continued)

OTHER PUBLICATIONS

CN-110304604-A, English Translation (Year: 2019).*
(Continued)

*Primary Examiner* — Ryan D Walsh
(74) *Attorney, Agent, or Firm* — Leydig, Voit & Mayer, Ltd.; John Augustyn

(57) ABSTRACT

Provided is a measuring device capable of enhancing convenience. The measuring device 1 comprises a first sensor 2 provided on a surface of an object 11 to be measured, an elastic body 3 that clamps the first sensor 2 between the elastic body 3 and the object 11 to be measured, a protective sheet 4 provided on the surface of the elastic body 3 on the side of the object 11 to be measured, a case 5 provided on the surface of the elastic body 3 on a side opposite from the object 11 to be measured, and a processing circuit 8 which is provided inside the case 5 and processes an output signal from the first sensor 2. The first sensor 2 is provided between the elastic body 3 and the protective sheet 4. The first sensor 2 is a strain sensor and includes a thin film piezoelectric element. The elastic body 3 is made of foamed rubber.

4 Claims, 7 Drawing Sheets

(51) Int. Cl.
  *B60C 23/04* (2006.01)
  *G01B 7/16* (2006.01)
  *G01L 1/16* (2006.01)
  *G01L 17/00* (2006.01)
  *B60C 23/20* (2006.01)
  *H01Q 1/22* (2006.01)

(52) U.S. Cl.
  CPC .............. *B60C 23/064* (2013.01); *G01L 1/16* (2013.01); *G01L 17/005* (2013.01); *B60C 2019/004* (2013.01); *B60C 23/20* (2013.01); *H01Q 1/2241* (2013.01)

(58) Field of Classification Search
  CPC ... B60C 2019/004; G01L 1/16; G01L 17/005; H01Q 1/2241
  See application file for complete search history.

(56) References Cited

U.S. PATENT DOCUMENTS

| 2006/0185429 | A1* | 8/2006 | Liu | B60C 23/0408 73/146.5 |
| 2007/0240501 | A1* | 10/2007 | Mancosu | B60C 23/0408 73/146 |
| 2009/0261962 | A1* | 10/2009 | Buck | H01Q 1/2241 29/601 |
| 2010/0043541 | A1* | 2/2010 | Kobayakawa | B60C 23/0493 73/146 |
| 2012/0291537 | A1* | 11/2012 | Honda | B60C 23/0447 73/146 |
| 2021/0370727 | A1* | 12/2021 | Yamaguchi | B29D 30/0061 |

FOREIGN PATENT DOCUMENTS

| DE | 19838349 A1 | 2/2000 | |
| DE | 102005028540 A1 | 12/2006 | |
| EP | 2085253 A1 | 8/2009 | |
| JP | 2003211926 A * | 7/2003 | ............. B60C 23/20 |
| JP | 2012-245889 A | 12/2012 | |
| JP | 2016-078473 A | 5/2016 | |
| JP | 2017088043 A * | 5/2017 | ......... B60C 23/0452 |
| JP | 2017-156258 A | 9/2017 | |
| JP | 2019-043478 A | 3/2019 | |
| WO | WO 2012/069515 A1 | 5/2012 | |
| WO | WO-2013155952 A1 * | 10/2013 | ......... B60C 23/0471 |

OTHER PUBLICATIONS

JP-2003211926-A, English Translation (Year: 2003).*
JP-2017088043-A, English Translation (Year: 2017).*
WO-2013155952-A1, English Translation (Year: 2013).*
International Search Report of International Application No. PCT/JP2020/035638, mailed Oct. 27, 2020.

* cited by examiner (☐: Resist Coating Area)

MEASURING DEVICE AND MEASURING SYSTEM

TECHNICAL FIELD

The present invention relates to a measuring device and a measuring system both of which are used to detect state of an object to be measured such as a tire.

BACKGROUND ART

Patent Document 1 below relates to a mounting structure for mounting a functional part for detection of state of a tire on an inner surface of a tire. This mounting structure comprises a pedestal made of an elastomer, a frame body having rigidity, a substrate having rigidity and a functional part. The pedestal is bonded to the inner surface of a tire. The frame body is placed on the top surface of the pedestal. The substrate is stored in the frame body. The functional part is mounted on the substrate. Examples of the functional part include a pressure sensor, temperature sensor and acceleration sensor.

PRIOR ART DOCUMENT

Patent Document 1: Japanese Laid-Open Patent Publication No. 2012-245889

SUMMARY OF THE INVENTION

Problem to be Solved by the Invention

According to the constitution of the Patent Document 1, since the sensor is mounted on the substrate having rigidity, for example, strain of the tire is not transmitted to the sensor, whereby measurement usage is limited, which is inconvenient.

It is an object of the present invention which was made in view of this situation to provide a measuring device capable of enhancing convenience.

Means for Solving Problem

One embodiment of the present invention relates to a measuring device. The measuring device comprises: a first sensor provided on a surface of an object to be measured, a case provided to ensure that the first sensor is located between the case and the object to be measured, an elastic body interposed between the case and the object to be measured, and a processing circuit which is provided inside the case and processes the output signal of the first sensor.

The first sensor may be surrounded by or covered with the elastic body with a space therebetween, or sandwiched between the elastic body and the object to be measured.

The first sensor may include a strain sensor.

The strain sensor may be a chip comprising a thin film piezoelectric element, the chip is mounted on a flexible substrate by wire bonding, and the flexible substrate has a wire connection part to which a wire extending to the outside is connected.

A wire connecting the chip and the flexible substrate may be covered with a protective material.

The strain sensor may be a chip having a thin film piezoelectric element, and the chip is flip-chip mounted on the flexible substrate.

The chip may be covered with a protective material.

A resist may be provided on the flexible substrate except for the chip mounting part.

A metal foil having a thickness of 20 µm or less may be formed on a surface of the flexible substrate on a side opposite from the chip, and the metal foil includes at least a part corresponding to the direct back side part of the chip.

The chip may be provided with a temperature sensor.

The measuring device may include a temperature sensor provided on the surface of the object to be measured, wherein the temperature sensor is located between the elastic body and the object to be measured.

The first sensor may be provided on a curved surface of the object to be measured, the elastic body is made of foamed rubber of EPDM or silicone, and the thickness of the elastic body is larger than the height difference of a part of the curved surface located right below the elastic body.

The measuring device may include a protective sheet provided on the surface of the elastic body on the side of the object to be measured, wherein the surface of the protective sheet on the side opposite from the elastic body is a contact surface with the object to be measured, and the first sensor is installed between the elastic body and the protective sheet.

The protective sheet may be made of EPDM, silicone rubber or olefin-based elastomer, and the thickness of the protective sheet is 1 mm or less.

The measuring device may include a second sheet provided on the surface of the elastic body on the side of the object to be measured side, wherein the second sheet is made of a material which is more easily bonded to the object to be measured than to the protective sheet, and the surface of the second sheet on the side opposite from the elastic body is a contact surface with the object to be measured.

The object to be measured may be a tire, and the measuring device is provided on the inner surface of the tire to obtain measurement results for estimating the state of the tire or the state of a road surface in contact with the tire.

Another embodiment of the present invention relates to a measuring system. The measuring system comprises: the measuring device; and a relay device attached to a valve used to adjust the air pressure of a tire and transmits the measurement result signal of the measuring device to an external terminal through the relay device.

The relay device and the measuring device may be wire-connected to each other, and power is supplied to the measuring device from the relay device.

The measuring device and the relay device may digitalize a sensing signal and the external terminal carries out arithmetic processing after digitalization.

The external terminal may store data in a storage server may be installed outside, and the data of the storage server can be accessed from another terminal.

Digitalized data of the sensing signal before arithmetic processing may be stored in the storage server, and actual measurement data on the state of the tire at the same timing as above is stored in the storage server, and a program used for the arithmetic processing is evaluated or updated based on the digitalized data before arithmetic processing and the actual measurement data.

It is to be noted that any arbitrary combination of the above-described structural components as well as the expressions according to the present invention changed among a system and so forth are all effective as and encompassed by the present aspects.

Effect of the Invention

According to the present invention, there can be provided a measuring device capable of enhancing convenience.

EMBODIMENTS FOR CARRYING OUT THE INVENTION

Figure 1:
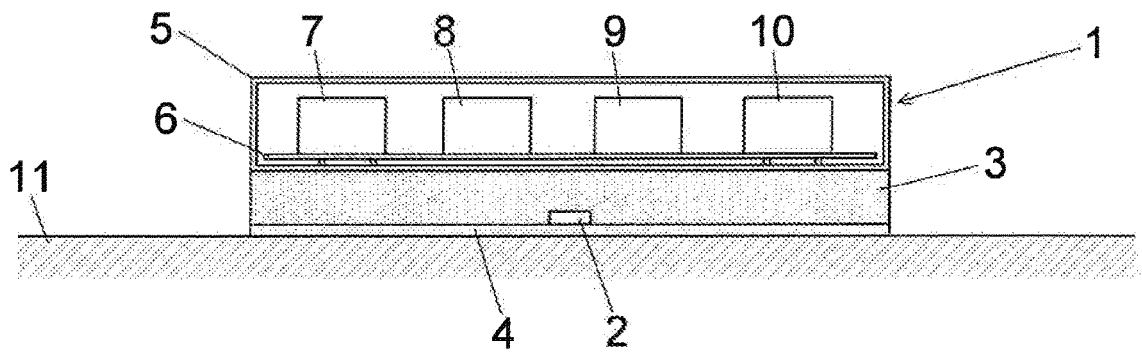
FIG. 1 is a sectional view showing that a measuring device 1 according to Embodiment 1 of the present invention is mounted on a flat surface of an object 11 to be measured.

Hereinafter, the same or equivalent constituent parts, members, etc., shown in the drawings are designated by the same reference numerals and will not be repeatedly described as appropriate. The embodiments are not intended to limit the invention but are mere exemplifications, and all features or combinations thereof described in the embodiments do not necessarily represent the intrinsic natures of the invention.

Figure 2:
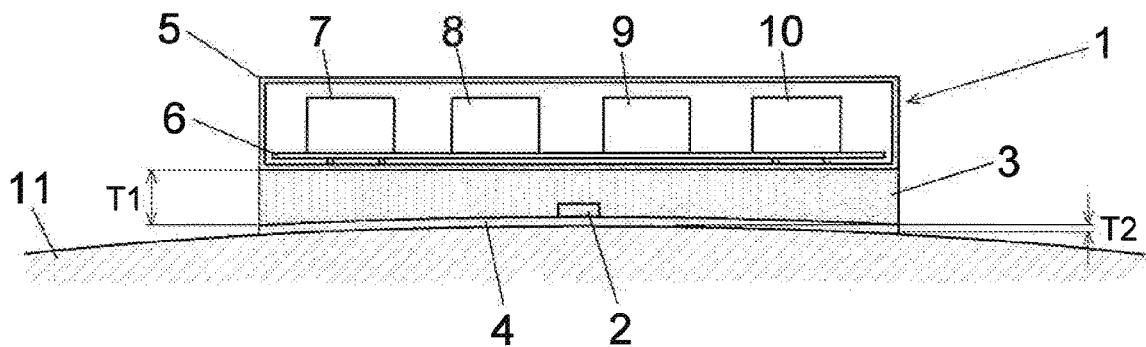
FIG. 2 is a sectional view showing that the measuring device 1 is mounted on a convex surface of the object 11 to be measured.
Figure 3:
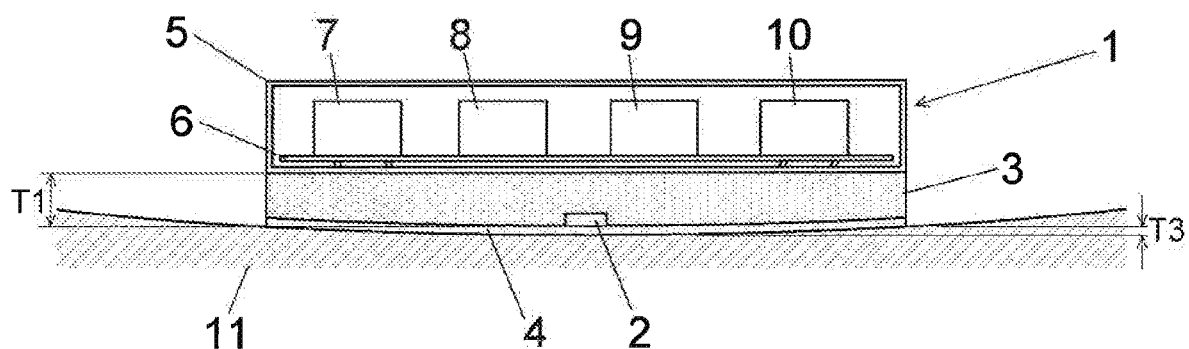
FIG. 3 is a sectional view showing that the measuring device 1 is mounted on a concave surface of the object 11 to be measured.

(Embodiment 1) Referring to FIGS. 1 to 11, there is shown Embodiment 1 of the present invention. This embodiment relates to a measuring device 1. The measuring device 1 is a sensor module which can be mounted on a surface of an object 11 to be measured. The surface of the object 11 to be measured which mounts the measuring device 1 is flat or curved. FIG. 1 shows that the surface is flat. FIG. 2 and FIG. 3 show the curved surfaces. The measuring device 1 obtains measurement results for estimating the state of the object 11 to be measured, such as the strain data of the object 11 to be measured. The object 11 to be measured is an object which deteriorates with time, undergoes a mechanical overload intermittently or deforms like a viscoelastic material. Examples of the object 11 to be measured include tires, structures such as bridge piers, belts for use in belt conveyors and rubber constituting various dampers.

In the case of a structure such as a bridge pier, the measuring device 1 is mounted on a curved surface of the structure. When a crack is produced in the structure, strain data measured by the measuring device 1 changes. The deterioration of the structure can be monitored by this change. In the case of a tire or belt, strain data during use is changed by deterioration. The deterioration state of the tire or belt can be monitored by this change. In the case of a belt, belt slack can be monitored by strain data as well. In the case of rubber constituting various dampers, the measuring device 1 is mounted on the curved surface of the rubber. When abnormality occurs in the rubber, strain data changes. The existence or nonexistence of the abnormality of a damper can be monitored by this change.

The measuring device 1 has a first sensor 2, an elastic body 3, a protective sheet 4 and a case (housing) 5. The first sensor 2 is a strain sensor. The first sensor 2 is a sensor (detection part) which has high necessity to be installed close to the object 11 to be measured. The first sensor 2 is mounted on the surface of the object 11 to be measured through the protective sheet 4. The first sensor 2 is sandwiched between the elastic body 3 and the object 11 to be measured. The first sensor 2 is fixed to the elastic body 3 or the protective sheet 4 by adhesion. The protective sheet 4 is provided on the surface of the elastic body 3 on the side of the object 11 to be measured (for example, fixed by adhesion). The surface of the protective sheet 4 on the side opposite from the elastic body 3 is a contact surface (adhesion surface) with the object 11 to be measured. The first sensor 2 is sandwiched between the elastic body 3 and the protective sheet 4. The case 5 is provided on the surface of the elastic body 3 on the side opposite from the object 11 to be measured (for example, fixed by adhesion).

The case 5 is preferably made of an insulating resin. The material of the case 5 does not prevent wireless communication between the inside and outside of the case. A substrate 6 is installed inside the case 5 (for example, fixed by screwing). A communication means 7, a processing circuit 8, a second sensor 9 and a power supply means 10 are mounted on the substrate 6. The communication means 7 is, for example, a wireless communication module. The communication means 7 has a function of wireless transmitting measurement results of the measuring device 1 to an unshown external terminal. The external terminal can display the measurement results. The processing circuit 8 is a circuit for processing the output signals of the first sensor 2 and the second sensor 9. The second sensor 9 is a sensor other than a strain sensor. The second sensor 9 is, for example, a temperature sensor, pressure sensor or acceleration sensor. The second sensor 9 is a sensor which has low necessity to be installed close to the object 11 to be measured. The power supply means 10 is, for example, a battery.

The elastic body 3 is preferably made of EPDM (ethylene-propylene-diene rubber) foamed rubber or silicone foamed rubber. When the elastic body 3 is made of foamed rubber, the measuring device 1 can be made lighter than a measuring device using an elastic body made of non-foamed rubber of the same size. When EPDM or silicone rubber which rarely changes with time is used as the elastic body 3, reliability can be enhanced. When the measuring device 1 is installed on the convex surface of the object 11 to be measured as shown in FIG. 2, the thickness T1 of the elastic body 3 is preferably larger than the height difference T2 of a part in contact with the protective sheet 4 of the curved surface, that is, a part right below the elastic body 3 of the curved surface, i.e., T1≥T2. T1≥T2×2 is more preferred. When the measuring device 1 is installed on the concave surface of the object 11 to be measured as shown in FIG. 3, the thickness T1 of the elastic body 3 is preferably larger than the height difference T3 of a part in contact with the protective sheet 4 of the curved surface, that is, a part right below the elastic body 3 of the curved surface, i.e., T1≥T3. T1≥T3×2 is more preferred. By setting the thickness T1 of the elastic body 3 to the above range, bending stress applied to the case 5 by the curved shape or deformation of the object 11 to be measured can be advantageously suppressed.

The protective sheet 4 is preferably made of EPDM, silicone rubber or olefin-based elastomer. Thereby, the temporal change of the hardness of the protective sheet 4 becomes small, and the influence of the temporal change on the output of the first sensor 2 can be suppressed, thereby making it possible to enhance detection accuracy. The protective sheet 4 is a thin elastic sheet made of non-foamed rubber. The area of the protective sheet 4 is substantially equal to the area of the elastic body 3. The thickness of the protective sheet 4 is preferably 1 mm or less. When the protective sheet 4 is too thick, while the strain of the object 11 to be measured is transmitted to the first sensor 2, the strain is greatly attenuated by the protective sheet 4. When the thickness of the protective sheet 4 is set to 1 mm or less, the strain of the object 11 to be measured can be transmitted to the first sensor 2 without being greatly attenuated. The first sensor 2 can be protected from impact, water or dust etc. by the protective sheet 4.

Figure 4:
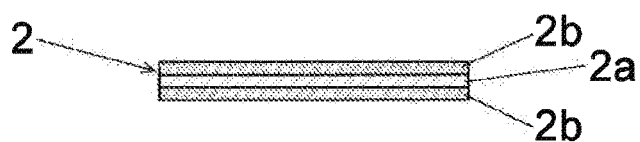
FIG. 4 is a sectional view of a first sensor 2 of the measuring device 1.

As shown in FIG. 4, the first sensor 2 is a chip (thin film piezoelectric element chip) having electrodes 2b on both sides of a piezoelectric thin film (thin film PZT) 2a, respectively. The thin film piezoelectric element has flexibility and can be advantageously used when the object 11 to be measured is greatly deformed. Since the thin film piezoelectric element generates charge by itself, the strain of the object 11 to be measured can be measured with small power.

Figure 5:
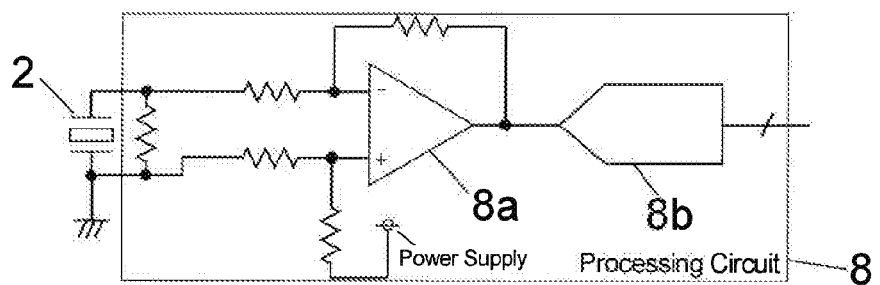
FIG. 5 is an exemplary circuit diagram of the first sensor 2 and a processing circuit 8 of the measuring device 1.

The output signal (sensing signal) of the first sensor 2 is processed by the processing circuit 8. As shown in FIG. 5, the processing circuit 8 includes an amplifier circuit having an operational amplifier 8a and an AD converter 8b. The processing circuit 8 amplifies the output signal which is an analog value of the first sensor 2 and converts it into a digital value.

Figure 6:
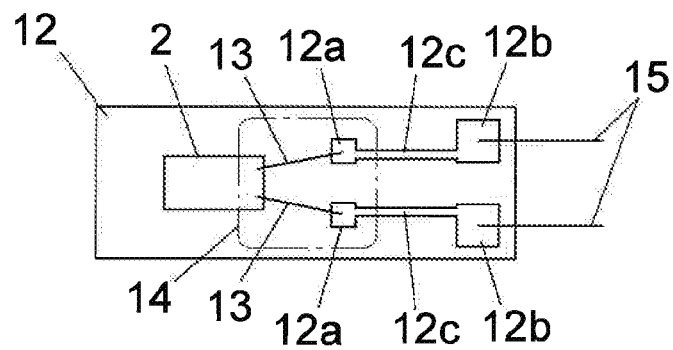
FIG. 6 is a plan view of the first sensor 2 and a flexible substrate 12 on which the first sensor 2 is mounted by wire bonding.
Figure 7:
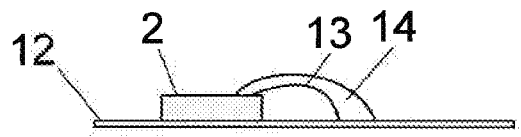
FIG. 7 is a sectional view of the configuration of FIG. 6.

In the example of FIG. 6 and FIG. 7, the first sensor 2 is mounted on a flexible substrate 12 by wire bonding. Bonding wires 13 electrically connect the first sensor 2 to electrodes (bonding pads) 12a on the flexible substrate 12. The bonding wires 13 are, for example, ultrafine metal wires made of, for example, gold, aluminum or copper. The bonding wires 13 are covered with a protective material 14. The protective material 14 is, for example, silicone rubber. The protective material 14 can prevent the bonding wires 13 from coming off. Wire connection parts (bonding pads) 12b and wire patterns 12c are provided on the flexible substrate 12. One end of a wire 15 for external connection is electrically connected to each of the wire connection parts 12b. A signal can be easily taken out to the outside by providing the wire connection parts 12b. Connection to an external circuit can be made easy by the wire 15. The other end of the wire 15 is guided into the case 5 and electrically connected to the substrate 6. The wire patterns 12c electrically connect the electrodes 12a to the wire connection parts 12b, respectively.

Figure 8:
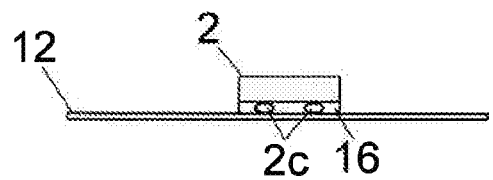
FIG. 8 is a sectional view of the first sensor 2 and the flexible substrate 12 on which the first sensor 2 is mounted by flip-chip mounting.

In the example shown in FIG. 8, the first sensor 2 is flip-chip mounted on the flexible substrate 12. Bumps 2c formed on the first sensor 2 are bonded to the flexible substrate 12. The space between the first sensor 2 and the flexible substrate 12 is filled with an adhesive (underfill) 16. The step of wire-bonding can be eliminated by flip-chip mounting. In any mounting method, the attenuation of the strain of the object 11 to be measured can be suppressed while the strain is transmitted to the first sensor 2 by providing the first sensor 2 on the flexible substrate 12, and it is easy to handle the sensor 2.

Figure 9:
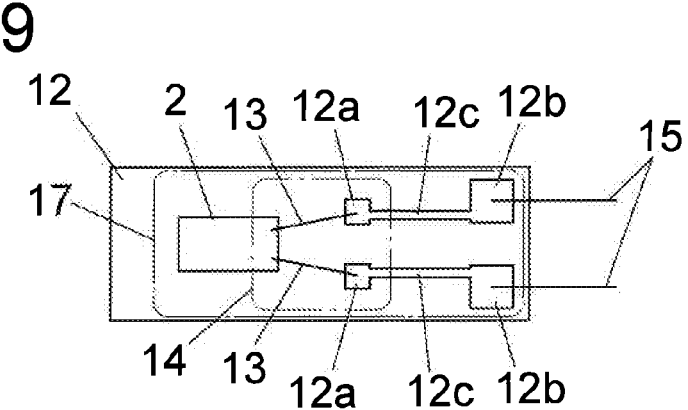
FIG. 9 is a plan view showing that a protective material 17 is added to FIG. 6.
Figure 10:
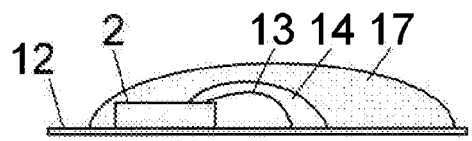
FIG. 10 is a sectional view of the configuration of FIG. 9.

As shown FIG. 9 and FIG. 10, a protective material 17 may be added to the constitution example of FIG. 6 and FIG. 7. The protective material 17 is a resin having high flexibility, for example, silicone rubber. The protective material 17 covers the first sensor 2 and all the parts on the top of the flexible substrate 12 to protect them. Since the protective material 17 is a highly flexible resin, the required deformation of the first sensor 2 as a strain sensor is not largely hindered. Although not shown, the same function and effect can be obtained by providing the protective material 17 even when the first sensor 2 is flip-chip mounted on the flexible substrate 12.

Figure 11:
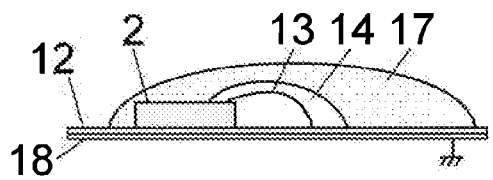
FIG. 11 is a sectional view showing that a shield 18 is provided on an under surface of the flexible substrate 12 shown in FIG. 10.

As shown in FIG. 11, a shield 18 may be additionally installed on the under surface of the flexible substrate 12 shown in FIG. 10, that is, the surface on the side opposite from the first sensor 2. The shield 18 is metal foil preferably having a thickness of 20 μm or less. By setting the thickness of the shield 18 to 20 μm or less, the shield 18 can be easily formed at a low cost and does not largely hinder the required deformation of the first sensor 2 as a strain sensor. The shield 18 is electrically connected to the ground. The shield 18 makes it possible to prevent a noise from being loaded on the output signal of the first sensor 2. The shield 18 is preferably provided on the entire under surface of the flexible substrate 12 but may be provided on only a predetermined area including the just back side part of the first sensor 2.

Figure 12:
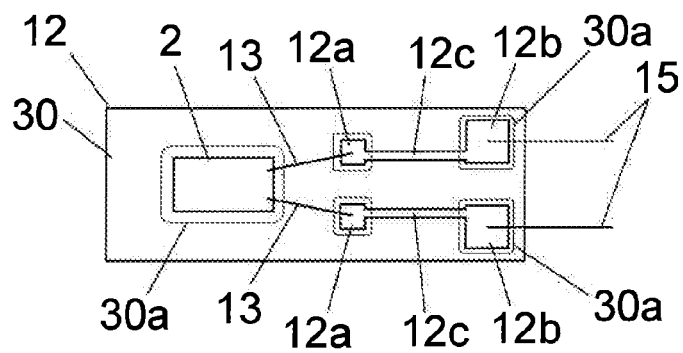
FIG. 12 is a plan view showing a resist 30 coating area on the flexible substrate 12.
Figure 13:
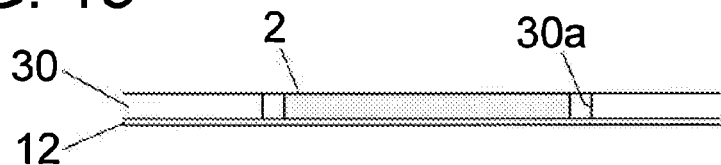
FIG. 13 is a sectional view of the configuration of FIG. 12.

With reference to FIG. 12 and FIG. 13, a description is subsequently given of a coating area when a resist (insulating film) 30 is coated on the flexible substrate 12. The resist 30 is, for example, a solder resist and formed on at least the top surface of the flexible substrate 12. The resist 30 is formed except for a part for mounting the first sensor 2. The resist 30 is also formed except for parts for forming the electrodes 12a and the wire connection parts 12b. In other word, the resist 30 has a plurality of penetrating opening parts 30a, and the first sensor 2, the electrodes 12a and the wire connection parts 12b are located inside the respective opening parts 30a. When the resist 30 is coated on the flexible substrate 12, the flexibility of each of the coated parts lowers. However, by forming the resist 30 except for the first sensor 2 mounting part, the reduction of the flexibility of the first sensor 2 mounting part of the flexible substrate 12 is suppressed. Therefore, the required deformation of the first sensor 2 as a strain sensor 2 is not largely hindered while the effect of insulating and protecting with the resist 30 is obtained.

According to this embodiment, the following functions and effects can be obtained.

(1) The first sensor 2 as a strain sensor is provided on the surface of the object 11 to be measured through the protective sheet 4. Therefore, unlike a conventional case in which a sensor is mounted on a substrate having rigidity, the strain of the object 11 to be measured can be measured. Therefore, measurement usage is expanded and convenience can be enhanced.

(2) The measuring device 1 has a second sensor other than a strain sensor. Therefore, the state other than strain of the object 11 to be measured can be measured and convenience can be enhanced.

(3) Since the substrate 6, the communication means 7, the processing circuit 8, the second sensor 9 and the power supply means 10 all of which have low necessity to be installed close to the object 11 to be measured are installed inside the case 5 to be protected from the external environment, reliability is enhanced.

(4) The elastic body 3 which is thicker than the protective sheet 4 is interposed between the case 5 and the object 11 to be measured. Therefore, bending stress applied to the case 5 by the curved shape and the deformation of the object 11 to be measured can be advantageously suppressed and the case 5 and the parts inside the case 5 can be protected from an impact.

(5) The measuring device 1 has the function of wireless transmitting measurement results to an unshown external terminal. Therefore, the measurement results are displayed by the eternal terminal to be informed to a user, thereby enhancing convenience.

Figure 14:
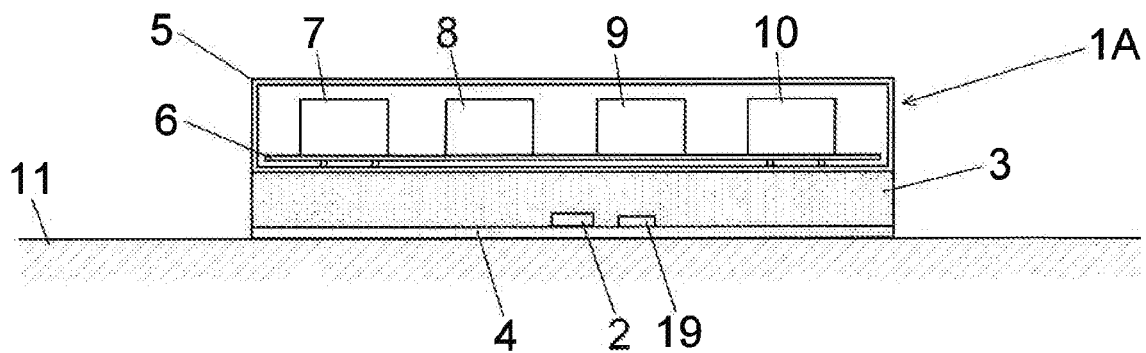
FIG. 14 is a sectional view showing that a measuring device 1A according to Embodiment 2 of the present invention is mounted on the flat surface of the object 11 to be measured.

(Embodiment 2) FIG. 14 is a sectional view showing that a measuring device 1A according to Embodiment 2 of the present invention is mounted on the flat surface of the object 11 to be measured. The measuring device 1A differs from the measuring device 1 of Embodiment 1 in that a temperature sensor 19 is added but the same in other points. The temperature sensor 19 is provided on the surface of the object 11 to be measured through the protective sheet 4. The temperature sensor 19 is sandwiched between the elastic body 3 and the protective sheet 4 (located between the elastic body 3 and the protective sheet 4). Although not shown, the temperature sensor 19 may be mounted on the flexible substrate 12 on which the first sensor 2 is mounted. The temperature sensor 19 detects the temperature of the object 11 to be measured. The influence of the temperature characteristics of the first sensor 2 and temperature change of the object 11 to be measured on the detection result can be compensated by the detection result of the temperature sensor 19.

Figure 15:
FIG. 15 is a plan view of the first sensor 2 of a measuring device according to Embodiment 3 of the present invention.
Figure 16:
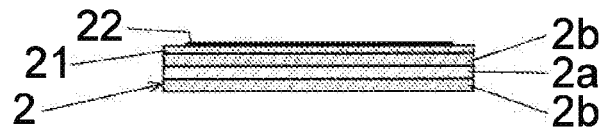
FIG. 16 is a sectional view of the configuration of FIG. 15.

(Embodiment 3) In this embodiment, the temperature sensor 19 provided separately from the first sensor 2 in Embodiment 2 is mounted on the same chip as that of the first sensor 2. Stated more specifically, as shown in FIG. 15 and FIG. 16, a resistance pattern 22 which will become the temperature sensor is formed on the top surface of a chip constituting the first sensor 2 through an insulating layer 21. A conductive body forming the resistance pattern 22 is, for example, platinum. The temperatures of the first sensor 2 and the object 11 to be measured can be detected based on the change of the resistance value of the resistance pattern 22 according to temperature. By using the resistance pattern 22 formed on the same chip as that of the first sensor 2 as a temperature sensor, the number of parts of the measuring device 1 can be reduced and the influence of temperature can be more accurately compensated.

Figure 17:
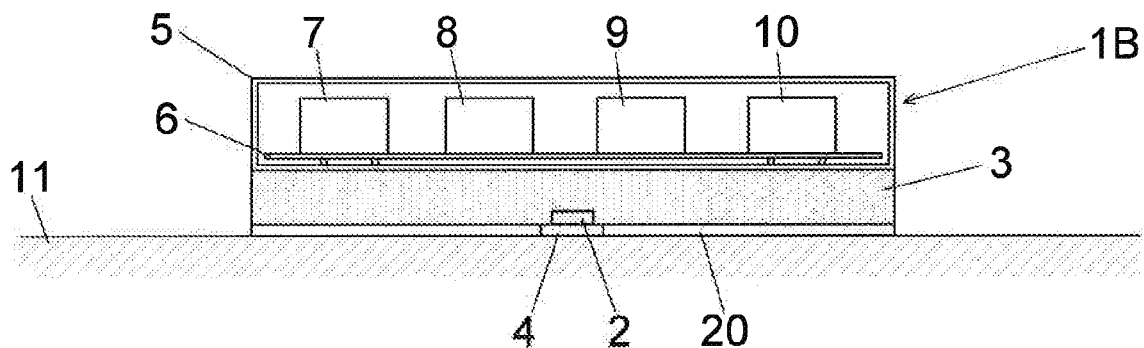
FIG. 17 is a sectional view showing that a measuring device 1B according to Embodiment 4 of the present invention is mounted on the flat surface of the object 11 to be measured.

(Embodiment 4) FIG. 17 is a sectional view showing that a measuring device 1B according to Embodiment 4 of the present invention is mounted on the flat surface of the object 11 to be measured. The measuring device 1B differs from the measuring device 1 of Embodiment 1 in that a part of the protective sheet 4 excluding a part right below the first sensor 2 and its vicinity, is replaced by a second sheet 20 but the same in other points. The second sheet 20 is provided on the elastic body 3 on the side of the object 11 to be measured in such a manner that it surrounds the protective sheet 4. The second sheet 20 is made of a material which is more easily bonded to the object 11 to be measured than to the protective sheet 4. The second sheet 20 is made of a material which is more easily bonded to the object 11 to be measured than EPDM, silicone rubber or olefin-based elastomer. The thickness of the second sheet 20 is substantially equal to the thickness of the protective sheet 4. The surface of the second sheet 20 on the side opposite from the elastic body 3 is a contact surface (bonding surface) with the object 11 to be measured. According to this embodiment, the measuring device 1 can be more firmly bonded and fixed to the surface of the object 11 to be measured by using the second sheet 20.

Figure 18:
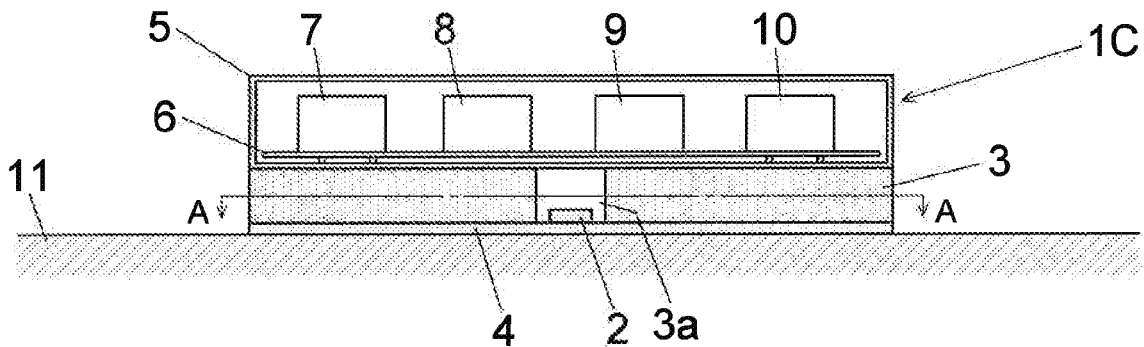
FIG. 18 is a sectional view showing that a measuring device 1C according to Embodiment 5 of the present invention is mounted on the flat surface of the object 11 to be measured.
Figure 19:
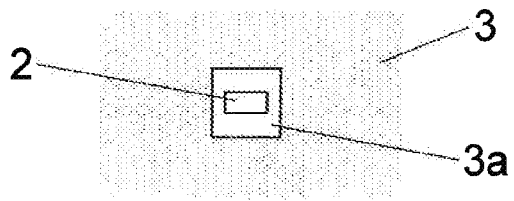
FIG. 19 is a sectional view taken on line A-A of FIG. 18.

(Embodiment 5) FIG. 18 is a sectional view showing that a measuring device 1C according to Embodiment 5 of the present invention is mounted on the flat surface of the object 11 to be measured. FIG. 19 is a sectional view taken on line A-A of FIG. 18. The measuring device 1C differs from the measuring device 1 of Embodiment 1 in that the elastic body 3 has a though hole 3a and the first sensor 2 is located inside the through hole 3a but the same in other points. The first sensor 2 and the case 5 are opposed to each other with a space therebetween. The elastic body 3 preferably surrounds the first sensor 2 with a space therebetween.

According to this embodiment, the first sensor 2 can be easily deformed by providing it inside the through hole 3a of the elastic body 3, thereby obtaining a larger sensing signal. That is, the measuring device obtains high sensitivity. Further, since the elastic body 3 does not press the first sensor 2 against the object 11 to be measured, a part right below the first sensor 2 of the protective sheet 4 can be prevented from swelling toward the object 11 to be measured. Thereby, the flatness of the surface of the protective sheet 4 on the side of the object 11 to be measured can be enhanced, and the adhesion to the object 11 to be measured of the protective sheet 4 can be improved. Further, it is possible to prevent force applied when the measuring device 1C is fixed to the surface of the object 11 to be measured by adhesion from being applied to the first sensor 2, whereby it is possible to suppress damage to the first sensor 2. Thereby, the defect occurrence rate of the measuring device can be reduced.

Figure 20:
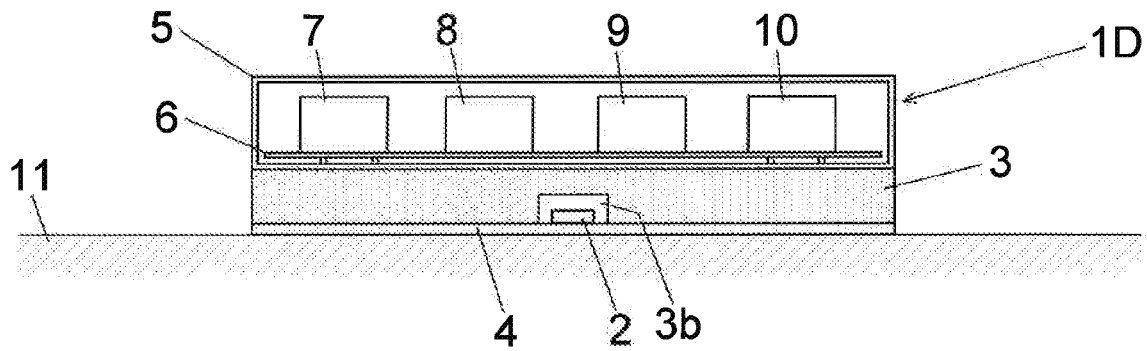
FIG. 20 is a sectional view showing that a measuring device 1D according to Embodiment 6 of the present invention is mounted on the flat surface of the object 11 to be measured.

(Embodiment 6) FIG. 20 is a sectional view showing that a measuring device 1D according to Embodiment 6 of the present invention is mounted on the flat surface of the object 11 to be measured. The measuring device 1D differs from the measuring device 1C of Embodiment 5 in that the through hole 3a of the elastic body 3 is replaced by a recessed part 3b but the same in other points. The recessed part 3b is formed in the surface of the elastic body 3 on the side of the object 11 to be measured. The first sensor 2 is located inside the recessed part 3b. The recessed part 3b is larger than the external size of the first sensor 2. Preferably, the recessed part 3b covers the first sensor 2 with a space therebetween. This embodiment can provide the same effect as that of Embodiment 5. The constitution that the through hole 3a is formed in the elastic body 3 in Embodiment 5 and the constitution that the recessed part 3b is formed in the elastic body 3 in Embodiment 6 may be applied to Embodiments 2 to 4.

Figure 21:
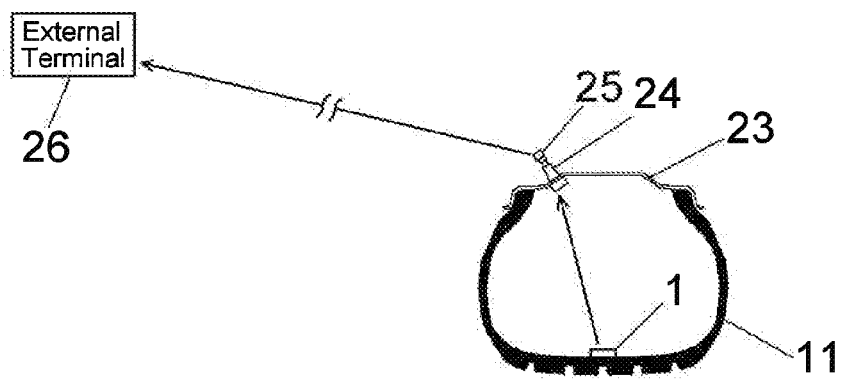
FIG. 21 is a schematic diagram for explaining a measuring system according to Embodiment 7 of the present invention.

(Embodiment 7) This embodiment relates to a measuring system for measuring the deterioration state of a tire. This measuring system has the measuring device 1 of Embodiment 1, a relay device (relay module) 25 and an external terminal 26 as shown in FIG. 21. The object 11 to be measured is a car tire. The measuring device 1 is mounted on the inner surface of the object 11 to be measured. The measuring device 1 obtains measurement results for estimating the state of the object 11 to be measured or the state of a road surface in contact with the object 11 to be measured.

The strain data of the object 11 to be measured obtained by the measuring device 1 changes according to the deterioration state of the object 11 to be measured. For example, as the tire becomes harder by temporal deterioration, strain data at the time of rotation changes. Therefore, the deterioration state of the tire can be estimated from the strain data. Further, the strain data changes according to the state of a road surface. Therefore, the state of the road surface can be estimated from the strain data. The measuring device 1 for estimating the state of the object 11 to be measured and the measuring device 1 for estimating the state of the road surface may be provided separately. In this case, for example, the measuring device 1 for estimating the state of the object 11 to be measured may be installed on the inner surface (rear surface) of a tread and the measuring device 1 for estimating the state of the road surface may be installed on the inner surface of a side wall. The measuring device 1 may be replaced by the measuring device of another embodiment. The object 11 to be measured is mounted to a wheel 23. The wheel 23 is provided with a valve 24 which is used to adjust the air pressure of the tire. The relay device 25 is mounted to (attached to) the valve 24. The external terminal 26 is, for example, the computer of a car having this tire.

Figure 22:
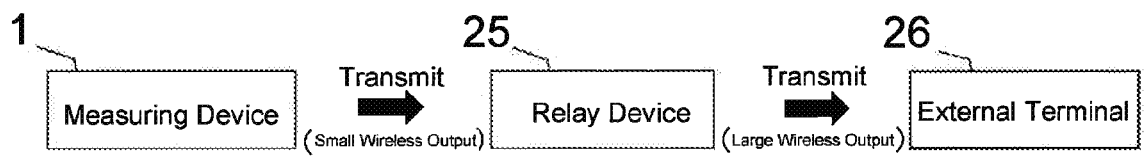
FIG. 22 is a schematic block diagram of the above measuring system.

As shown in FIG. 22, the measurement result signal of the measuring device 1 is transmitted to the external terminal 26 through the relay device 25. That is, the measurement result signal is transmitted to the relay device 25 from the measuring device 1 and then to the external terminal 26 from the relay device 25. Since the distance between the measuring device 1 and the relay device 25 is small, the wireless output of the measuring device 1 may be small as compared with a case in which the measuring device 1 directly transmits the measurement result signal to the external terminal 26. Therefore, the battery exchange frequency of the measuring device 1 can be reduced. On the other hand, since the distance between the relay device 25 and the external terminal 26 is large, the wireless output of the relay device 2 must be made large. However, as the battery of the relay device 25 attached to the valve 24 can be easily exchanged as compared with the measuring device 1 inside the tire, convenience is high.

Figure 23:
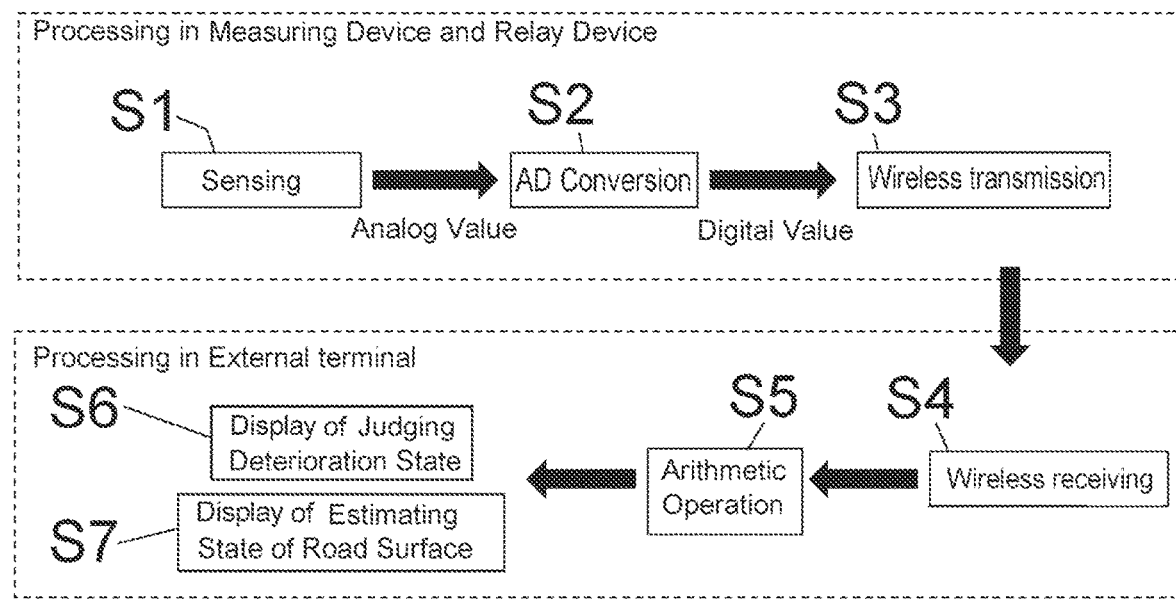
FIG. 23 is a diagram for explaining the processing of the above measuring system.

As shown in FIG. 23, the measuring device 1 and the relay device 25 carry out sensing (S1), the analog-digital conversion (S2) of a sensing signal which is an analog signal obtained by sensing, and the wireless transmission (S3) of the digital sensing signal to the external terminal 26. The external terminal 26 receives the signal from the relay device 25 (S4), carries out arithmetic operation based on the received signal (S5), judges the deterioration state of the object 11 to be measured and displays the result of the judgment (S6), and estimates the state of the road surface in contact with the object 11 to be measured and displays the estimation result (S7). Thus, since the external terminal 26 carries out arithmetic processing after the analog-digital conversion of the measurement result signal, as compared with a case in which the arithmetic processing is carried out by the measuring device 1 and the relay device 25, the consumption powers of the measuring device 1 and the relay device 25 can be made small and the battery exchange frequencies of the measuring device 1 and the relay device 25 can be reduced.

Figure 24:
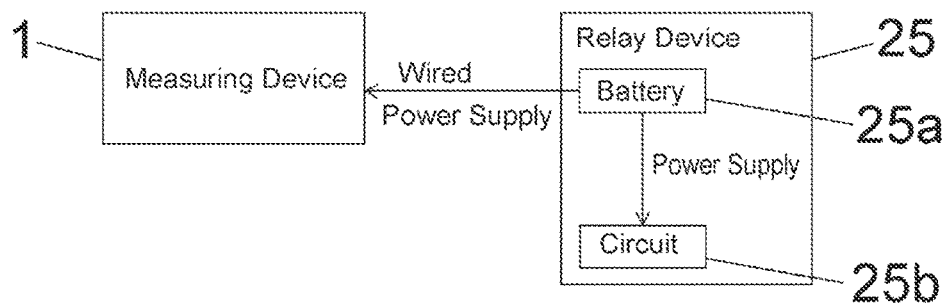
FIG. 24 is a schematic block diagram of a measuring system according to Embodiment 8 of the present invention.

(Embodiment 8) This embodiment relates to a measuring system. This measuring system differs from the measuring system of Embodiment 7 in that the measuring device 1 and the relay device 25 are wire-connected to each other and the measurement device 1 has no battery as shown in FIG. 24 but the same in other points. In FIG. 24, the external terminal 26 is not shown. The operating power of the measuring device 1 is wire-supplied from the battery 25a of the relay device 25. The power supply means 10 shown in FIG. 1 of the measuring device 1 is a connector for connecting a power line extending from the relay device 25. The battery is not required for the measuring device 1 by supplying power to the measuring device 1 from the relay device 25, thereby eliminating the need for the battery exchange of the measuring device 1. When the measuring device 1 and the relay device 25 are wire-connected to each other, the measurement result signal may be wire-transmitted to the relay device 25 from the measuring device 1. In this case, the communication means 7 shown in FIG. 1 of the measuring device 1 is a connector for connecting a wire for wired communication.

Figure 25:
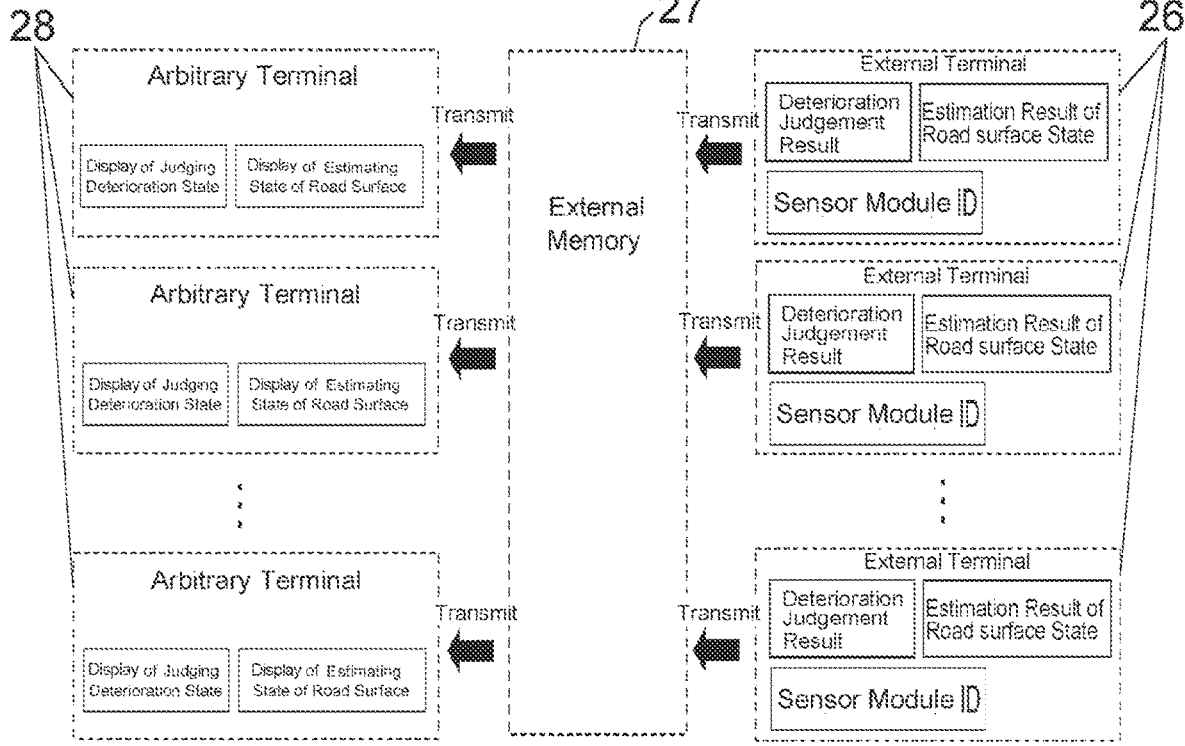
FIG. 25 is a schematic block diagram of a measuring system according to Embodiment 9 of the present invention.

(Embodiment 9) FIG. 25 is a schematic block diagram of a measuring system according to Embodiment 9 of the present invention. Each of large number of external terminals 26 shown in FIG. 25 is the same as the external terminal 26 of the measuring system of Embodiment 7 and combined with the measuring device and the relay device which are not shown. Each of the external terminals 26 stores (uploads) data such as the result of judgment on the deterioration state of a tire corresponding thereto, the estimation result of the state of a road surface and ID (sensor module ID) of a measuring device corresponding thereto in an external memory (storage server) 27. The external memory 27 can be accessed from arbitrary terminals 28 other than the external terminals 26. The arbitrary terminals 28 can download necessary data from the external memory 27. According to this, data does not need to be stored in the external terminals 26. A user can check data relating to a tire from any place where communication is possible at a free timing. For example, a user who manages large number of cars, such as an employee in charge of management of a car sharing company, can perform the unitary management of the states of the tires of cars existent at different places and the history of road surfaces that the cars ran over, which is very convenient.

Figure 26:
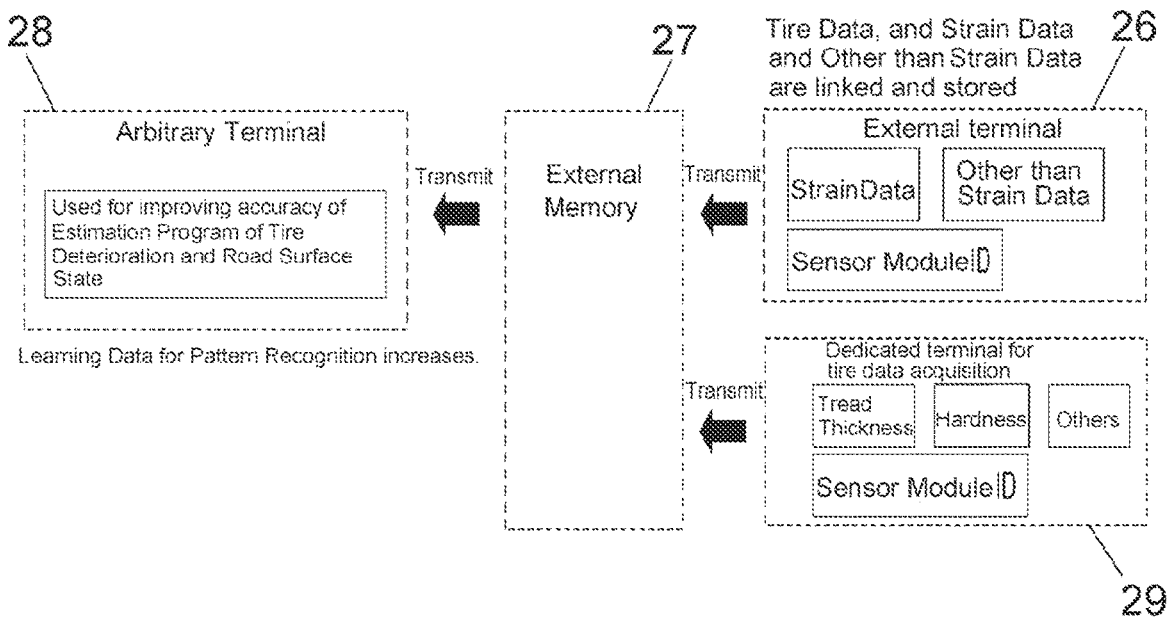
FIG. 26 is a schematic block diagram of a measuring system according to Embodiment 10 of the present invention

(Embodiment 10) FIG. 26 is a schematic block diagram of a measuring system according to Embodiment 10 of the present invention. An external terminal 26 shown in FIG. 26 is the same as the external terminal 26 of the measuring system of Embodiment 7 and combined with the measuring device and the relay device which are not shown. The external terminal 26 stores the ID of a measuring device corresponding thereto, the strain data of a tire obtained from the measuring device and data other than the strain data in the external memory 27 regularly. The strain data and the data other than the strain data are data which have been digitalized after sensing and before arithmetic processing is not carried out after digitalization. At the same timing, a terminal 29 dedicated for the acquisition of tire data stores the tread thickness, hardness and other data of the tire in the external memory 27 together with the ID of the above measuring device. The terminal 29 dedicated for the acquisition of tire data is existent, for example, at a maintenance facility and stores actual measurement data such as the tread thickness and hardness of the tire in the external memory 27. The storage timing is the timing for car inspection or periodic inspection. According to this, the strain data and data other than the strain data of the tire obtained by the measuring device, and the actual tread thickness and hardness of the tire at the same timing as above are stored in the external memory 27 in such a manner that they correlate with each other. An arbitrary terminal 28 evaluates or updates a program used for arithmetic processing in order to estimate the state of the tire and the state of the road surface from the strain data and data other than the strain data based on the strain data and data other than the strain data of the tire and the actual tread thickness and hardness of the tire. According to this embodiment, learning data showing the relationship increases between the strain data and the data other than the strain data of the tire and the actual tread thickness and hardness of the tire, thereby enhancing the estimation accuracy of the actual tread thickness and hardness of the tire from the strain data and data other than the strain data of the tire.

Having described the present invention as related to the embodiments, it is to be understood by those skilled in the art that various changes and modification may be made on the constituent elements and the processing processes of the embodiments without departing from the scope of the accompanying claims. Modifications are described hereinbelow.

The protective sheet 4 may be a polyester or polyimide sheet or film. The protective sheet 4 may be eliminated from the measuring devices of the embodiments, and the first sensor 2 may be brought into direct contact with the object 11 to be measured. A strain sensor constituting the first sensor 2 may be made of a metal resistor, PVDF (polyvinylidene fluoride), electroactive polymer EAP or pressure-sensitive conductive rubber besides PZT (lead zirconate titanate).

The first sensor 2 is not limited to a strain sensor and may be, for example, two electrodes provided on the same plane as that of the object 11 to be measured. Electric characteristics such as electrostatic capacity, parasitic resistance or dielectric loss tangent between the above two electrodes can be specified by applying AC voltage having a predetermined frequency within the range of 1 kHz to 10 MHz between the two electrodes. The electric characteristics between the above two electrodes are changed by the deterioration state of the object 11 to be measured. Therefore, the deterioration state of the object 11 to be measured can be estimated from the electric characteristics between the above two electrodes. A circuit for applying AC voltage between the two electrodes may be provided inside the case 5.

EXPLANATION OF REFERENCE SYMBOLS 1, 1A to 1D measuring device (sensor module), 2 first sensor (strain sensor), 2a piezoelectric thin film (thin film PZT), 2b electrode, 2c bump, 3 elastic body, 3a through hole, 3b recessed part, 4 protective sheet, 5 case (housing), 6 substrate (rigid substrate), 7 communication means (wireless communication module), 8 processing circuit, 8a operational amplifier, 8b AD converter, 9 second sensor, 10 power supply means, 11 object to be measured, 12 flexible substrate, 12a electrode (bonding pad), 12b wire connection part, 12c wire pattern, 13 bonding wire, 14 protective material, 15 wire, 16 adhesive (underfill), 17 protective material, 18 shield (metal foil), 10 temperature sensor, 20 second sheet, 21 insulating layer, 22 resistance pattern, 23 wheel, 24 valve, 25 relay device (relay module), 25a battery, 25b circuit, 26 external terminal, 27 external memory (storage server), 28 arbitrary terminal, 29 terminal dedicated for the acquisition of tire data, 30 resist (insulating film), 30a opening part

The invention claimed is:

1. A measuring device comprising:
a first sensor provided on a surface of an object to be measured,
a case provided to ensure that the first sensor is located between the case and the object to be measured,
an elastic body interposed between the case and the object to be measured, and
a processing circuit which is provided inside the case and processes the output signal of the first sensor, wherein
the first sensor includes a strain sensor,
the strain sensor is a chip comprising a thin film piezoelectric element, the chip is mounted on a flexible substrate by wire bonding, and the flexible substrate has a wire connection part to which a wire extending to the outside is connected, and
a metal foil having a thickness of 20 μm or less is formed on a surface of the flexible substrate on a side opposite from the chip, and the metal foil includes at least a part corresponding to the direct back side part of the chip.

2. A measuring device comprising:
a first sensor provided on a surface of an object to be measured,
a case provided to ensure that the first sensor is located between the case and the object to be measured,
an elastic body interposed between the case and the object to be measured,
a processing circuit which is provided inside the case and processes the output signal of the first sensor, and
a protective sheet provided on the surface of the elastic body on the side of the object to be measured, wherein the surface of the protective sheet on the side opposite from the elastic body is a contact surface with the object to be measured, and the first sensor is installed between the elastic body and the protective sheet.

3. The measuring device according to claim 2, wherein the protective sheet is made of EPDM, silicone rubber or olefin-based elastomer, and the thickness of the protective sheet is 1 mm or less.

4. The measuring device according to claim 2, comprising a second sheet provided on the surface of the elastic body on the side of the object to be measured side, wherein the second sheet is made of a material which is more easily bonded to the object to be measured than to the protective sheet, and the surface of the second sheet on the side opposite from the elastic body is a contact surface with the object to be measured.

* * * * *